(12) United States Patent
Mangold et al.

(10) Patent No.: US 6,242,373 B1
(45) Date of Patent: Jun. 5, 2001

(54) BORON OXIDE-SILICON DIOXIDE MIXED OXIDE

(75) Inventors: Helmut Mangold, Rodenbach; Manfred Ettlinger, Karlstein, both of (DE); Dieter Kerner, Midland Park, NJ (US); Peter Kleinschmit, Hanau (DE)

(73) Assignee: Degussa-huls AG, Frankfurt am Main (DE)

( * ) Notice: Subject to any disclaimer, the term of this patent is extended or adjusted under 35 U.S.C. 154(b) by 0 days.

(21) Appl. No.: 09/541,915

(22) Filed: Apr. 3, 2000

Related U.S. Application Data

(62) Division of application No. 08/878,824, filed on Jun. 19, 1997, now Pat. No. 6,083,859.
(60) Provisional application No. 60/029,845, filed on Oct. 29, 1996.

(30) Foreign Application Priority Data

Jun. 19, 1996 (DE) .............................. 196 24 392

(51) Int. Cl.⁷ .................................... C03C 3/04
(52) U.S. Cl. ................. 501/27; 501/27; 501/66; 501/133; 423/278; 423/326; 423/337; 423/513
(58) Field of Search ................. 501/27, 66, 133; 423/326, 337, 278, 593

(56) References Cited

U.S. PATENT DOCUMENTS 2,239,551 * 4/1941 Dalton et al. ...................... 65/33.4
3,855,171 * 12/1974 Wegehaupt et al. ................ 524/857
4,347,229 * 8/1982 Schmid et al. ..................... 423/336
4,749,665 * 6/1988 Yano et al. ......................... 501/32
5,106,812 * 4/1992 Yamaguchi et al. ............... 502/439
5,108,732 * 4/1992 Krumbe et al. .................... 423/592
5,185,309 * 2/1993 Aono et al. ........................ 502/202
5,252,752 * 10/1993 Aono et al. ........................ 502/202

OTHER PUBLICATIONS

CPI Basic Abstracts Journal; Sep. 9, 1987: No. 87–194590/28.*

Ullmans Encyclopedia Industrial Chemistry; 1993; vol. A23, pp. 635–640.*

Chem. Abstracts; 1; vol. 94, No. 8; Abstract 49/11N, Apr. 1980.*

Ullmans Encyclopedia der technischen Chemie; 1982; vol. 21 pp. 464–465.*

Ullmans Encyclopedia der technischen Chemie; 1964, vol. 15, p. 726.*

* cited by examiner

*Primary Examiner*—Karl Group
(74) *Attorney, Agent, or Firm*—Pillsbury Winthrop LLP

(57) ABSTRACT

A boron oxide-silicon dioxide mixed oxide which has a BET surface of less than 100 m²g, and optionally containing oxides of aluminium, titanium or zirconium, is prepared pyrogenically by flame hydrolysis. The mixed oxide is used in glass making.

12 Claims, 16 Drawing Sheets

BORON OXIDE-SILICON DIOXIDE MIXED OXIDE

This is a division of application Ser. No. 08/878,824, filed Jun. 19, 1997 now U.S. Pat. No. 6,083,859.

This application is based on application Ser. No. 19624392.0 filed in Germany on Jun. 19, 1996 and provisional application Ser. No. 60/029,845 filed in the United States on Oct. 29, 1996, the content of which are incorporated hereinto by reference.

BACKGROUND OF THE INVENTION

1. Field of the Invention

The invention relates to a boron oxide-silicon dioxide mixed oxide, a process for its preparation, and its use.

2. Prior Art

Document DE-A 21 22 066 describes the use or pyrogenically produced mixed oxides of boron with silicon, aluminum, titanium and/or iron having a boron content of 2 to 20 wt. %, calculated as elementary boron, as a filler in organopolysiloxane compositions (for example bouncing putty). In particular these mixed oxides contain 5 to 10 wt. % of boron, calculated as elementary boron. These mixed oxides can be prepared by using metals and/or metal compounds according to Ullmanns Enzyclopadie der technischen Chemie, (Ullmanns Encyclopedia of Industrial Chemistry), Vol. 15 (1964), p.726. They are preferably prepared from volatile compounds of boron and silicon, aluminum, titanium and/or iron, especially the chlorides of the aforementioned elements, in the presence of water formed in situ at temperatures above 800° C., i.e. by flame hydrolysis. The mixed oxides obtained have a BET surface of 100 to 400 $m^2/g$.

According to the example given in document DE-A 21 22 066, 4.8 kg/h of $SiCl_4$ and 1.2 kg/h of boron trichloride are vaporised and burnt together with 1.5 $m^3/h$ of hydrogen in a combustion chamber, under the addition of 4.2 $m^3/h$ of air. The temperature in the combustion chamber is more than 800° C. The resultant mixed oxide contains 82.5 wt. % of SiO2 and 17.5 wt. % of $B_2O3$ (=5 wt. % of boron) calculated as boron and has a BET surface of 180 $m^2/g$.

The known boron oxide-silicon dioxide mixed oxide has the disadvantage that it occurs in very finely divided form having a BET surface greater than 100 $m^2/g$. It is unsuitable for use as a raw material in glass-making.

The known process has the disadvantage that boron trichloride is used as starting material for the boron oxide. Boron trichloride is a poisonous compound with a boiling point of 12.5° C. When used at room temperature special safety measures are therefore necessary. The commercially available boron trichloride may contain noticeable amounts of poisonous phosgene as impurity.

The object of the invention is therefore to prepare a boron oxide-silicon dioxide mixed oxide that does not have these disadvantages.

SUMMARY OF THE INVENTION

The invention provides a boron oxide-silicon dioxide mixed oxide, which is characterised in that it has a BET surface of less than 100 $m^2/g$, preferably 10 to 80 $m^2/g$, in particular 25 to 50 $m^2/g$.

The proportion of boron oxide-may be from 0.01 to 40 wt. %.

In a further development of the invention the boron oxide-silicon dioxide mixed oxide may contain a further oxide or further oxides of metals and/or metalloids as a constituent of the mixed oxide.

Such metals or metalloids may be aluminum, titanium or zirconium.

In a preferred embodiment the boron oxide-silicon dioxide mixed oxides according to the invention may be prepared pyrogenically.

The known process of flame hydrolysis may preferably be employed for this purpose. This process is described in Ullmanns Enzyclopadie der technischen Chemie, 4th Ed., Vol. 21 (1982), pp. 464 and 465.

The boron oxide-silicon dioxide mixed oxide according to the invention having a BET surface of less than 100 $m^2/g$, preferably 10 to 80 $mg^2/g$, in particular 25 to 50 $m^2/g$, can be prepared by vaporising silicon halides and/or organosilicon halides, for example methyl trichlorosilane, preferably the chloride $SiCl_4$ with a vaporisable boron compound, for example trimethyl borate, separately or together, optionally with the addition of vaporisable compounds of the metalloids and/or metals aluminum, titanium, zirconium, for example $AlCl_3$, $ZrCl_4$, $TiCl_4$ or the like, mixing the vapours together with a carrier gas, for example air and/or nitrogen, in a mixer unit, preferably in a burner of known construction, with hydrogen as well as air and optionally further gases such as oxygen and nitrogen, reacting the gases in a flame, then cooling the hot gases and the solid, separating the gases from the solid, and optionally removing halide or raw material residues adhering to the product by a heat treatment with moist air.

The process according to the invention has the advantage that the trimethyl borate that is used is miscible in all proportions with $SiCl_4$, and it is therefore possible to adjust the ratio exactly. Since the boiling point of trimethyl borate of 68° C. is sufficiently close to the boiling point of silicon tetrachloride, it can be vaporised jointly with silicon tetrachloride from a vaporisation unit.

The boron oxide-silicon dioxide mixed oxide according to the invention, which may optionally also contain $TiO_2$, $Al_2O_3$ and/or $ZrO_2$, can be used to make high-purity glasses. The high purity and the adjusted particle fineness of the mixed oxide according to the invention are of particular advantage.

BRIEF DESCRIPTION OF THE DRAWINGS

The invention now will be described with respect to the accompanying drawings wherein.

DETAILED DESCRIPTION OF PREFERRED EMBODIMENTS OF THE INVENTION

EXAMPLES

Preparation of Boron oxide-silicon Dioxide Mixed Oxide

Examples 1 to 4

Figure 1:
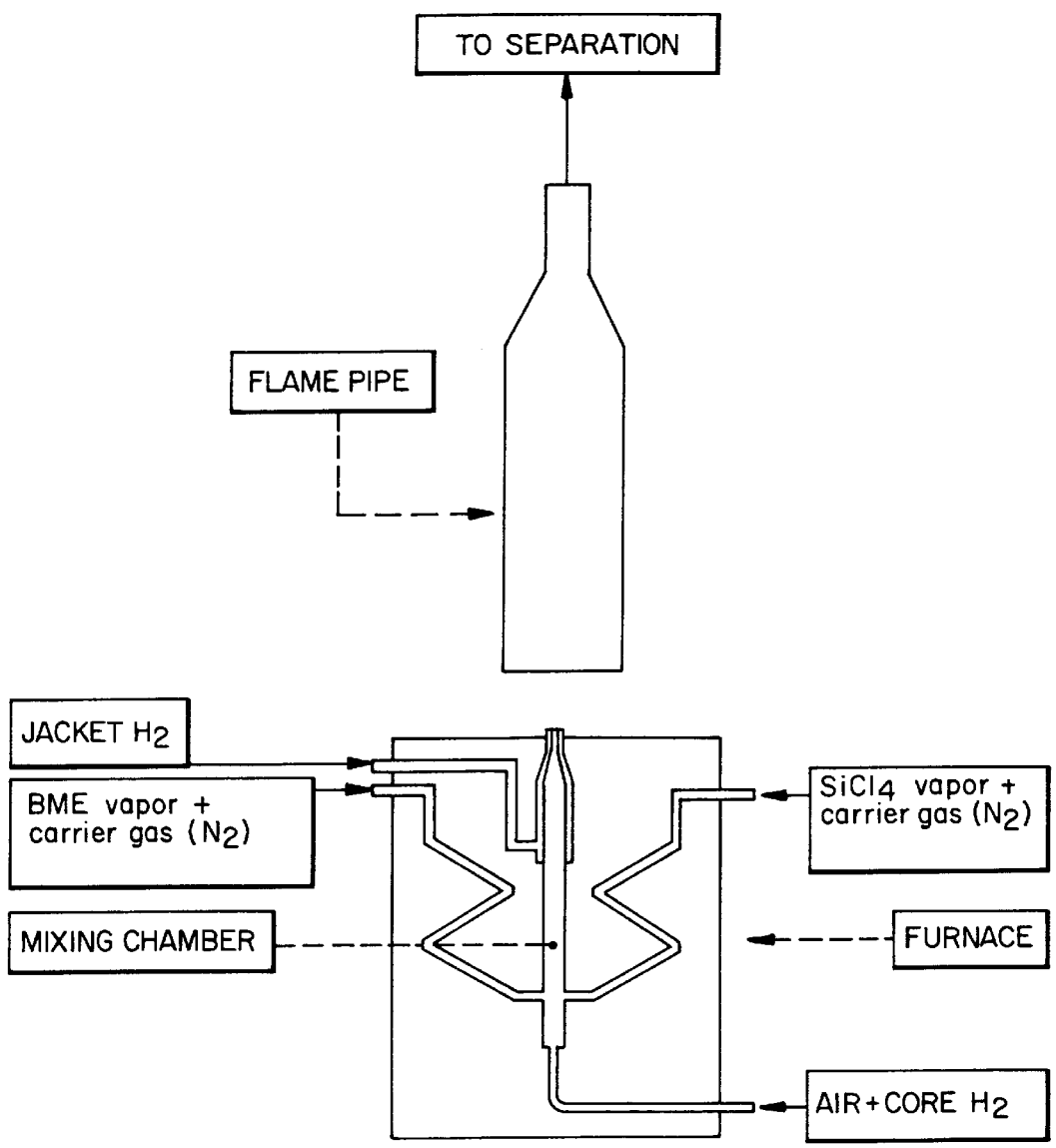
FIG. 1 is a diagrammatic illustration of a burner arrangement used for Examples 1–4 of the invention.

The burner arrangement for examples 1 to 4 is shown diagrammatically in FIG. 1.

The burner is housed in a heated flirnace part, the temperature of the furnace being roughly the same as the outflow temperature of the gas mixture. The burner consists of a mixing chamber to which is connected a nozzle from which the gas mixture flows, as well as a second (jacket) nozzle annularly surrounding the first nozzle, from which in addition jacket) hydrogen is blown into the flame in order to avoid agglomerations (in the nozzle region).

Example 1

1.0796 kg/h of SiCl4 are vaporised at ca. 130° C. and conveyed together with 0.1 Nm³/h of nitrogen as carrier gas into the mixing chamber of the burner. 0.51 Nm³/h of air as well as 0.107 Nm³/h of oxygen and 0.3 Nm³/h of (core) hydrogen are) fed into the same mixing chamber.

0.0643 kg/h of trimethyl borate are vaporised at ca. 120° C. in a separate vaporisation device and are likewise fed into the mixing chamber of the burner by entrainment in a stream of nitrogen (0.02 Nm³/h). The gas mixture flows at a rate of 12 m/sec (referred to standard conditions) from the nozzle opening of the burner and bums in a reaction chamber (flame pipe).

The temperature of the gas mixture ($SiCl_4$)-air-hydrogen, oxygen, trimethyl borate) is measured at the mouth of the burner, and is found to be 128° C. 0.05 Nm³/h of hydrogen (jacket hydrogen, room temperature) are fed into the annular nozzle surrounding the mouth of the burner.

After the flame hydrolysis the reaction gases and the boron oxide-silicon dioxide mixed oxide are sucked through a cooling system by applying a vacuum and are cooled to ca. 100 to 160° C. The solid is separated from the waste gas stream in a filter. The boron oxide-silicon dioxide mixed oxide occurs as a white, finely particulate powder.

The specific surface is 45 m²/g, and the analytically determined $B_2O_3$ content is 4.2 wt. % (=1.3 wt. % of boron, calculated as boron).

The adjustment parameters are summarised in Table 1.

Example 2

The procedure described in Example 1 is employed and the following amounts are used:

0.9387 kg/h of $SiCl_4$ with 0.1 Nm³/h of nitrogen as carrier gas, air 0.76 Nm³/h, oxygen 0.159 Nm³/h (core) hydrogen 0.268 Nm³/h.

0.05 Nm³/h of hydrogen are fed into the annular nozzle surrounding the mouth of the burner. The gas mixture flows at a rate of 14 m/sec (referred to standard conditions) from the nozzle opening of the burner.

0.1777 kg/h of trimethyl borate are vaporized in a separate vaporization device and likewise fed into the mixing chamber of the burner by entrainment in a stream of nitrogen (0.02 Nm³/h).

The specific surface of the boron oxide-silicon dioxide mixed oxide is 34 m²/g, and the analytically determined $B_2O_3$ content is 13.3 wt. % (=4.1 wt. % of boron, calculated as boron).

The adjustment parameters are summarised again in Table 1.

The boron oxide-silicon dioxide obtained has the following particle size distribution:

Total number of particles (N ) 3223.

Particle diameter, arithmetic mean (DN) 45.72 (NM)

Particle diameter, averaged over (DA) 60.81 (NM)

surface

Percentage distribution

| Diameter D (NM) | Number N | Number % | Sum Number % SN % | Sum Wt. % SND % |
|---|---|---|---|---|
| 7.450 | 40. | 1.241 | 1.241 | 0.003 |
| 10.210 | 123. | 3.816 | 5.057 | 0.030 |
| 12.970 | 155. | 4.809 | 9.867 | 0.099 |
| 15.730 | 105. | 3.258 | 13.124 | 0.182 |
| 18.490 | 56. | 1.738 | 14.862 | 0.254 |
| 21.250 | 64. | 1.986 | 16.848 | 0.380 |
| 24.010 | 64. | 1.986 | 18.833 | 0.560 |
| 26.770 | 78. | 2.420 | 21.253 | 0.865 |
| 29.530 | 98. | 3.041 | 24.294 | 1.379 |
| 32.290 | 86. | 2.668 | 26.962 | 1.970 |
| 35.050 | 109. | 3.382 | 30.344 | 2.926 |
| 37.810 | 127. | 3.940 | 34.285 | 4.325 |
| 40.570 | 173. | 5.368 | 39.652 | 6.680 |
| 43.330 | 198. | 6.143 | 45.796 | 9.963 |
| 46.090 | 193. | 5.988 | 51.784 | 13.814 |
| 48.850 | 191. | 5.926 | 57.710 | 18.352 |
| 51.610 | 178. | 5.523 | 63.233 | 23.339 |
| 54.370 | 160. | 4.964 | 68.197 | 28.580 |
| 57.130 | 153. | 4.747 | 72.944 | 34.395 |
| 59.890 | 135. | 4.189 | 77.133 | 40.306 |
| 62.650 | 140. | 4.344 | 81.477 | 47.322 |
| 65.410 | 113. | 3.506 | 84.983 | 53.767 |
| 68.170 | 109. | 3.382 | 88.365 | 60.805 |
| 70.930 | 86. | 2.668 | 91.033 | 67.060 |
| 73.690 | 64. | 1.986 | 93.019 | 72.280 |
| 76.450 | 52. | 1.613 | 94.632 | 77.015 |
| 79.210 | 43. | 1.334 | 95.966 | 81.371 |
| 81.970 | 26. | 0.807 | 96.773 | 84.289 |
| 84.730 | 28. | 0.869 | 97.642 | 87.761 |
| 87.490 | 26. | 0.807 | 98.449 | 91.310 |
| 90.250 | 22. | 0.683 | 99.131 | 94.606 |
| 93.010 | 10. | 0.310 | 99.442 | 96.246 |
| 95.770 | 3. | 0.093 | 99.535 | 96.783 |
| 98.530 | 5. | 0.155 | 99.690 | 97.757 |
| 101.290 | 3. | 0.093 | 99.783 | 98.393 |
| 104.050 | 7. | 0.217 | 100.000 | 100.000 |

DN=45./2

DA=60.81

D50=45.27
K=4
A(K)=0.1247
FQS=1.7246
DN/D50=1.0100
DA/D50=1.3434
DA/DN=1.3301
These data are illustrated graphically in FIGS. 5 to 10.

Example 3

The procedure described in Example 1 is employed, the following amount being used:

00.5005 kg/h of $SiCl_4$ with 0.1 $Nm^3/h$ of nitrogen as carrier gas, air 0.726 $Nm^3/h$, oxygen 0.152 $Nm^3/h$, (core) hydrogen 0.14 $Nm^3/h$.

0.05 $Nm^3/h$ of hydrogen are fed into the annular nozzle surrounding the mouth of the burner. The gas mixture flows at a rate of 12 m/sec (referred to standard conditions) and at a temperature of 124° C. from the nozzle opening of the burner.

0.225 kg/h of trimethyl borate are vaporized in a separate vaporization device and are likewise fed into the mixing chamber of the burner by entrainment in a stream of nitrogen (0.02 $Nm^3/h$).

The specific surface of the boron oxide-silicon dioxide mixed oxide is 39 $m^2/g$, and the analytically determined $B_2O_3$ content is 23.0 wt. % (=7.1 wt. % of boron, calculated as boron).

The adjustment parameters are again summarized in Table 1.

Example 4

The procedure described in Example 1 is adopted, the following amounts being used:

0.365 kg/h of $SiCl_4$, with 0.1 $Nm^3/h$ of nitrogen as carrier gas, air 0.759 $Nm^3/h$, oxygen 0.159 $Nm^3$Ih, hydrogen 0.103 $Nm^3/h$.

0.05 $Nm^3/h$ of hydrogen are fed into the annular nozzle surrounding the mouth of the burner.

0.2575 kg/h of trimethyl borate are vaporized in a separate vaporization device and are likewise fed into the mixing chamber of the burner by entrainment in a stream of nitrogen (0.02 $Nm^3/h$).

The gas mixture flows at a rate of 12 m/sec (referred to standard conditions) and at a temperature of 125° C. from the nozzle opening of the burner.

The specific surface of the boron oxide-silicon dioxide mixed content is 30 $m^2/g$, and the analytically determined $B_2O_3$ content is 29.0 wt. % (=9.0 wt. % or boron calculated as boron).

The adjustment parameters are again summarized in Table 1.

TABLE 1

Experimental conditions and flame parameters calculated therefrom in the preparation of pyrogenic boron oxide-silicon dioxide mixed oxides

| No. | $SiCl_4$ [kg/h] | TMB [kg/h] | Air [$Nm^3/h$] | $O_2$ [$Nm^3/h$] | $H_2$ core [$Nm^3/h$] | $N_2$ core [$Nm^3/h$] | gamma [—] | lambda [—] | BET [$m^2/g$] | $B_2O_3$ [wt. %] |
|---|---|---|---|---|---|---|---|---|---|---|
| 1 | 1.0796 | 0.0643 | 0.510 | 0.107 | 0.300 | 0.12 | 1.27 | 1.01 | 45 | 4.2 |
| 2 | 0.9387 | 0.1777 | 0.760 | 0.159 | 0.268 | 0.12 | 1.78 | 1.03 | 34 | 13.3 |
| 3 | 0.5005 | 0.2250 | 0.726 | 0.152 | 0.140 | 0.12 | 2.72 | 1.04 | 39 | 23.0 |
| 4 | 0.3651 | 0.2575 | 0.759 | 0.159 | 0.103 | 0.12 | 3.67 | 1.04 | 30 | 29.0 |

TMB=Trimethiyl borate B $(OCH_3)_3$

Ratio $H_2$ gamma=Ratio of fed-in hydrogen in the core (taking into account the hydrogen contained in TMB) to stoichiometrically required hydrogen Ratio $O_2$ lambda=Ratio of fed-in oxygen (atmospheric oxygen+additionally added $O_2$) in the burner to stoichiometrically required oxygen

Deacidification and Removal of Raw Material Residues

In order to remove raw material residues that have possibly incompletely reacted and are still adhering to the product, and to reduce the chloride content of the samples, the oxides prepared according to Examples 1 to 9 can undergo a finther temperature treatment stage.

For this purpose the powders are treated with moist air in a countercurrent downpipe arrangement at temperatures between 400° and 700° C. (preferably 650° C.). (Deacidification)

The analysis date of the powders prepared according to Examples 1 to 4 before and after deacidification are summarised in Tables 2 and 3.

TABLE 2

Analysis data of the samples obtained according to Examples 1 to 4
(B—Si-mixed oxide)

| | Before deacidification | | | | | After deacidification | | | | |
|---|---|---|---|---|---|---|---|---|---|---|
| No | BET $m^2/g$ | $B_2O_3$ Wt. % | TV Wt. % | GV Wt. % | Cl Content Wt. % | BET $m^2/g$ | $B_2O_3$ Wt. % | TV Wt. % | GV Wt. % | Cl Content ppm |
| 1 | 45 | 4.2  | 1.5 | 0.4 | 200 | 46 | 3.6  | 0.6 | 0.1 | 138 |
| 2 | 34 | 13.3 | 1.8 | 2.7 | 142 | 37 | 10.1 | 0.4 | 1.5 | 87  |
| 3 | 39 | 23.0 | 0.8 | 3.1 | 87  | 44 | 22.2 | 0.5 | 2.5 | 18  |
| 4 | 30 | 29.0 | 1.0 | 3.8 | 48  | 33 | 28.6 | 0.7 | 1.3 | 13  |

TV=Drying loss (2 h at 105° C., according to DIN/ISO 787/II, ASTM D 280, JIS K 5101/21)

GV=Annealing loss (2 h at 1000° C., according to DIN 55921, ASTM D 1208, JIS K 5101/23, referred to the substance dried for 2 hours at 105° C.

TABLE 3

Further analysis data of the samples obtained
according to Examples 1 to 4
(B—Si-mixed oxide)

| | Before deacidification | | | | After deacidification | | |
|---|---|---|---|---|---|---|---|
| No. | BET $m^2g$ | pH | Bulk density g/l | Tamped density g/l | BET $m^2/g$ | pH | Bulk density g/l | Tamped density g/l |
| 1 | 45 | 3.84 | 58 | 69 | 46 | 4.09 | 88 | 113 |
| 2 | 34 | 3.89 | 46 | 52 | 37 | 3.93 | 91 | 115 |
| 3 | 39 | 3.69 | 39 | 46 | 44 | 3.88 | 69 | 87  |
| 4 | 30 | 3.52 | 41 | 48 | 33 | 3.88 | 94 | 118 | pH=pH in 4t aqueous suspension.,

Tamped density according to DIN/ISO 787/XI, JIS K 5101/18 (not screened).

Figure 2:
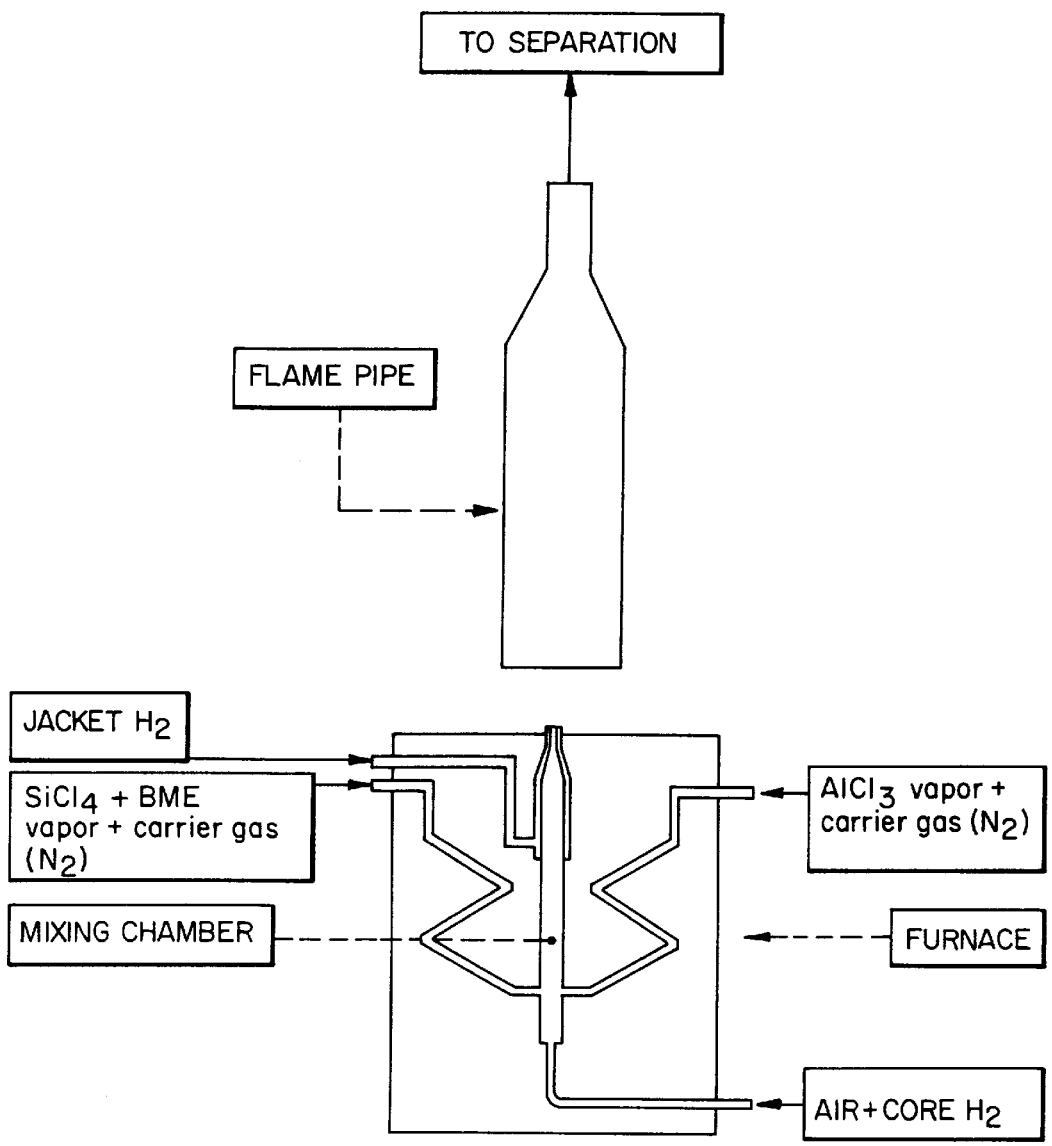
FIG. 2 is a diagrammatic illustration of a burner arrangement used for Examples 5–9 of the invention.
Figure 3:
FIG. 3 is an electron microscope photograph of the powder of Example 2.
Figure 4:
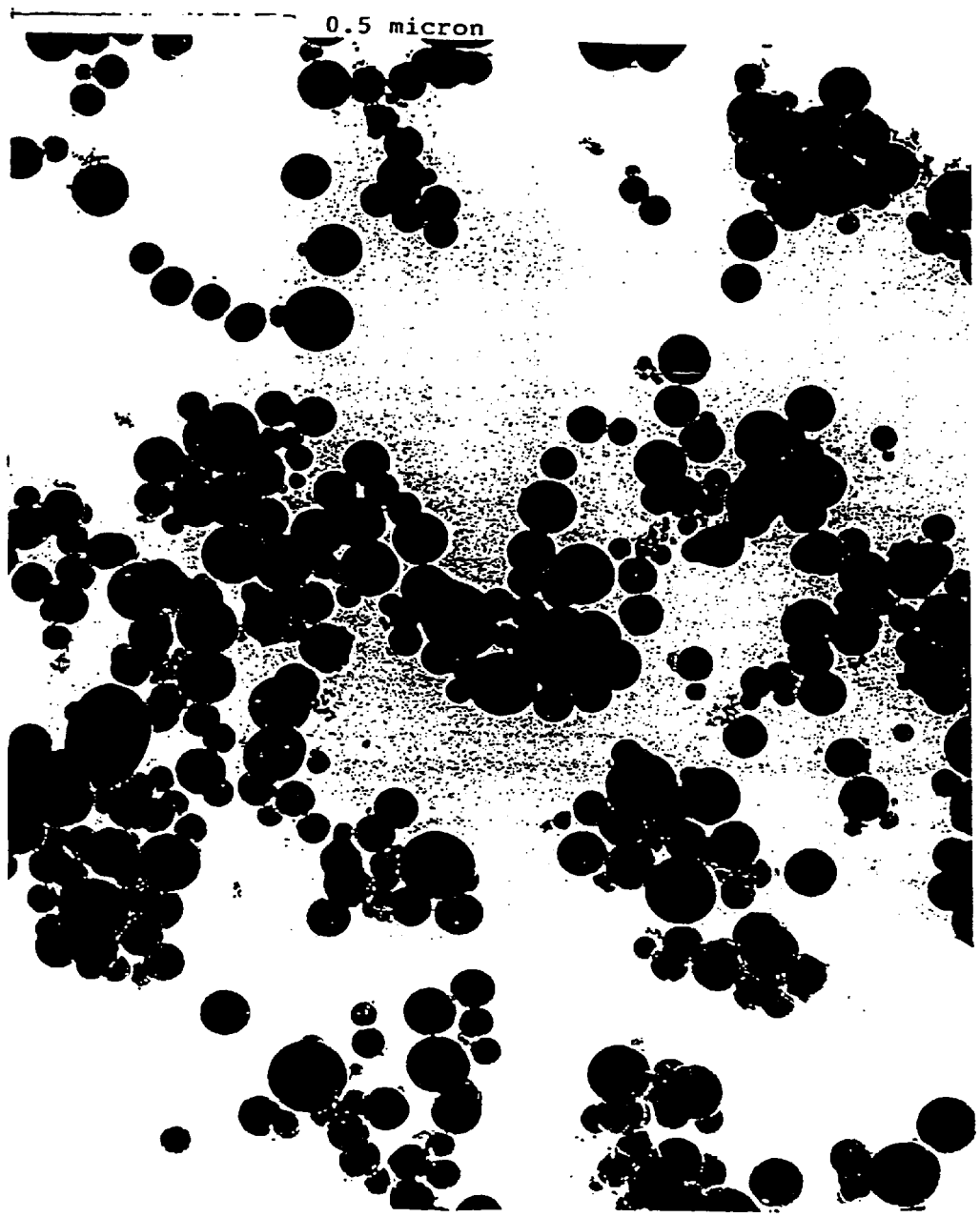
FIG. 4 is an electron microscope photograph of the powder of Example 9.
Figure 5:
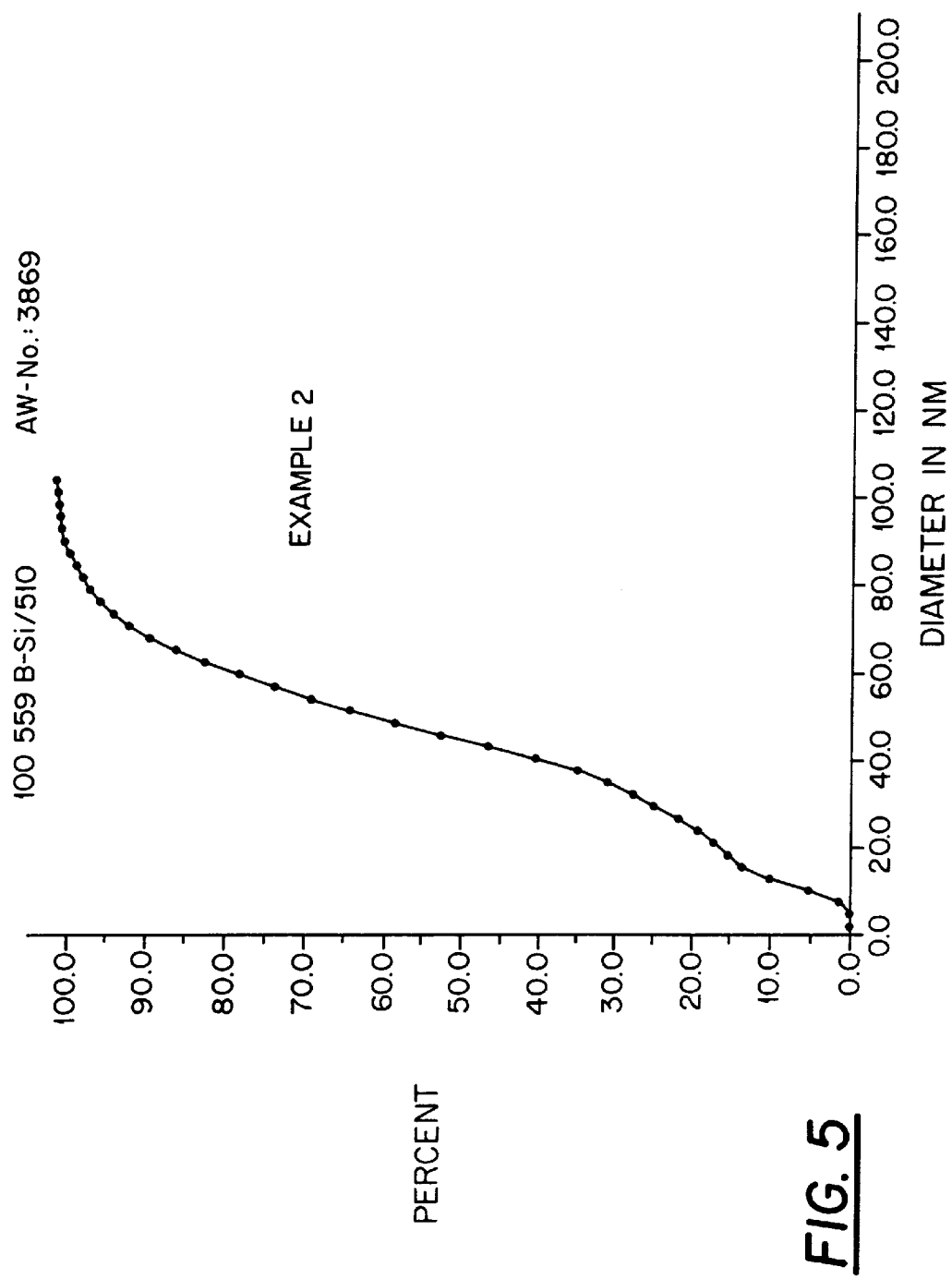
FIG. 5 is a summation curve of the number distribution of Example 2.
Figure 6:
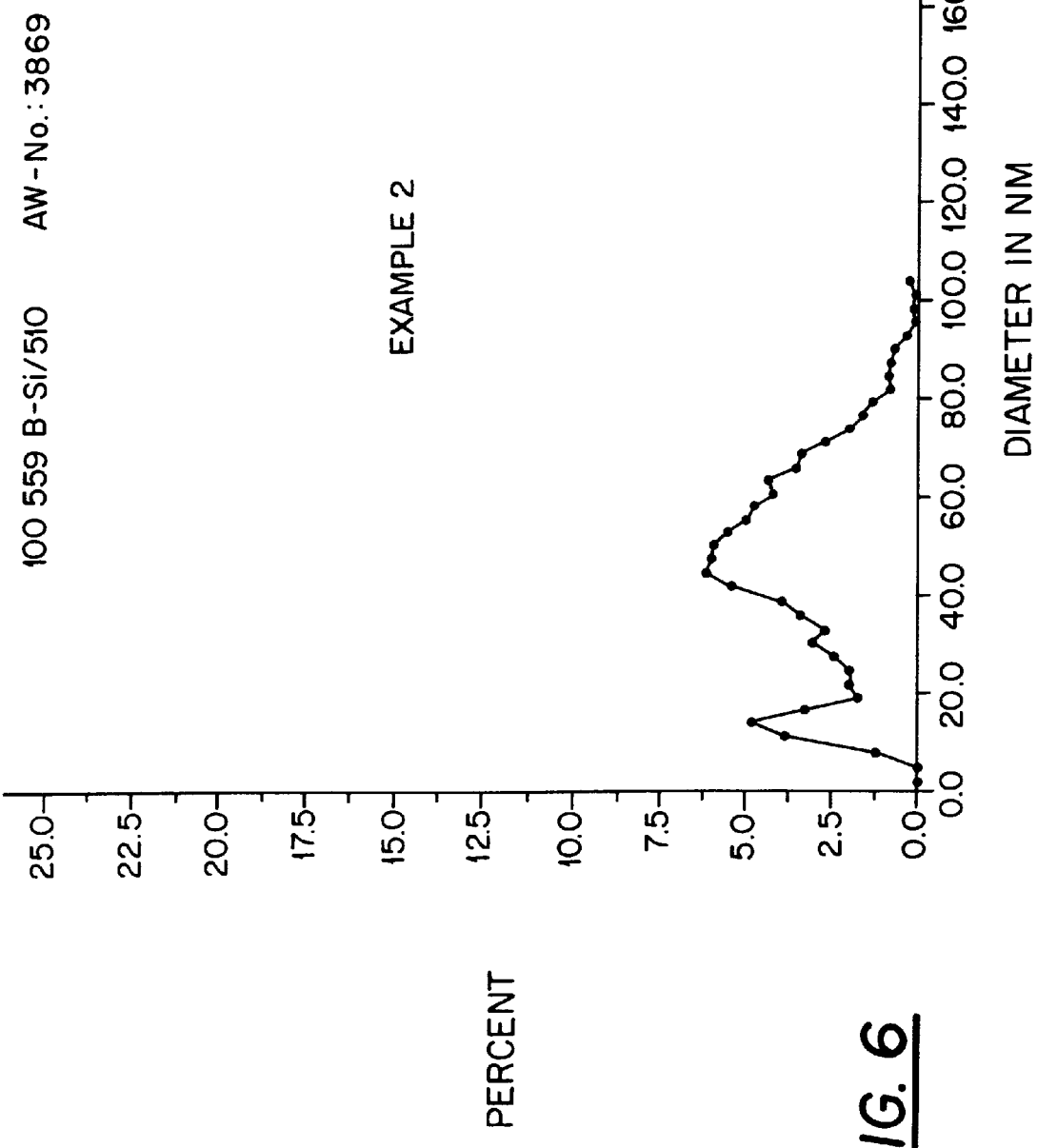
FIG. 6 is a differential curve of the number distribution of Example 2.
Figure 7:
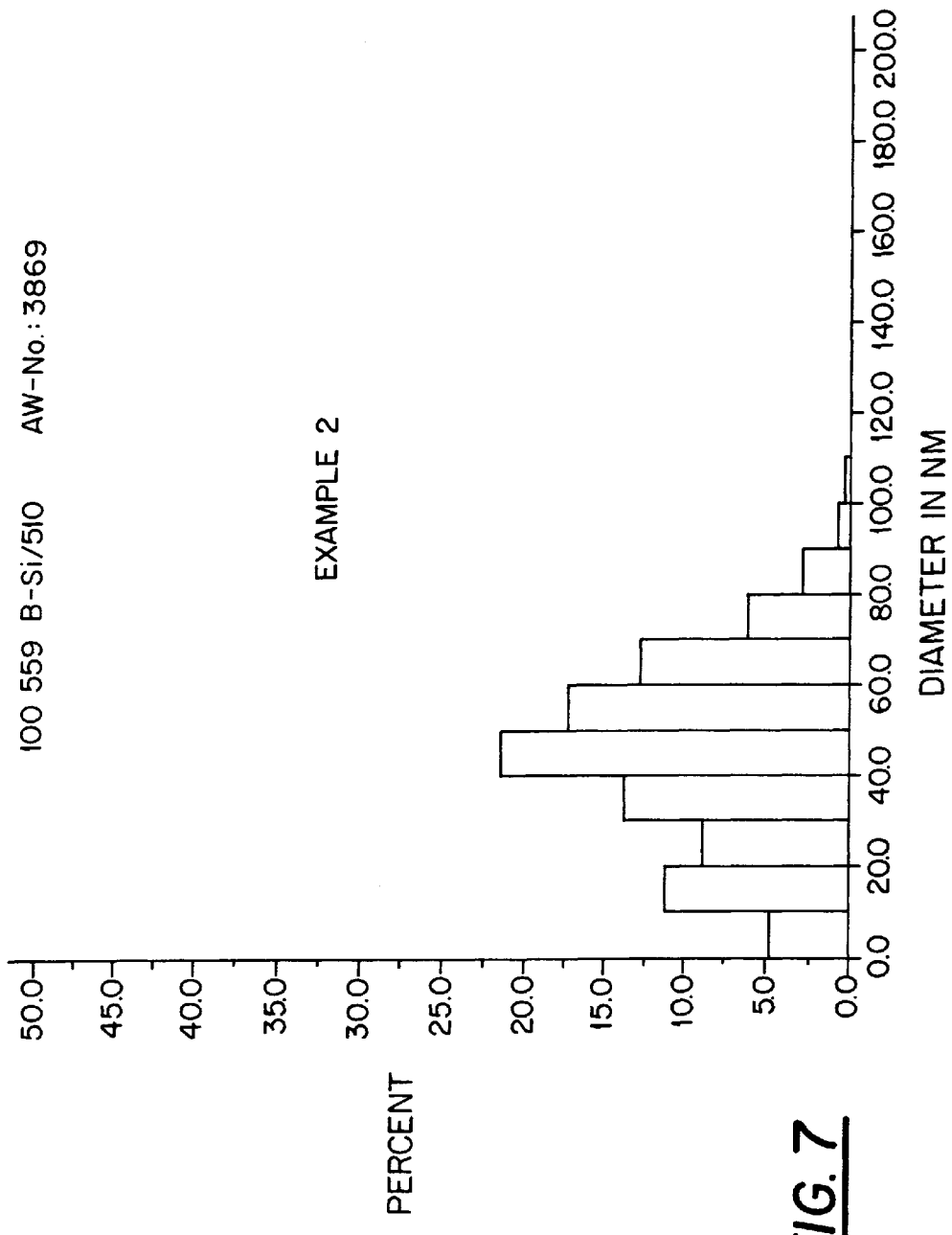
FIG. 7 is a class frequency representation of the number distribution of Example 2.
Figure 8:
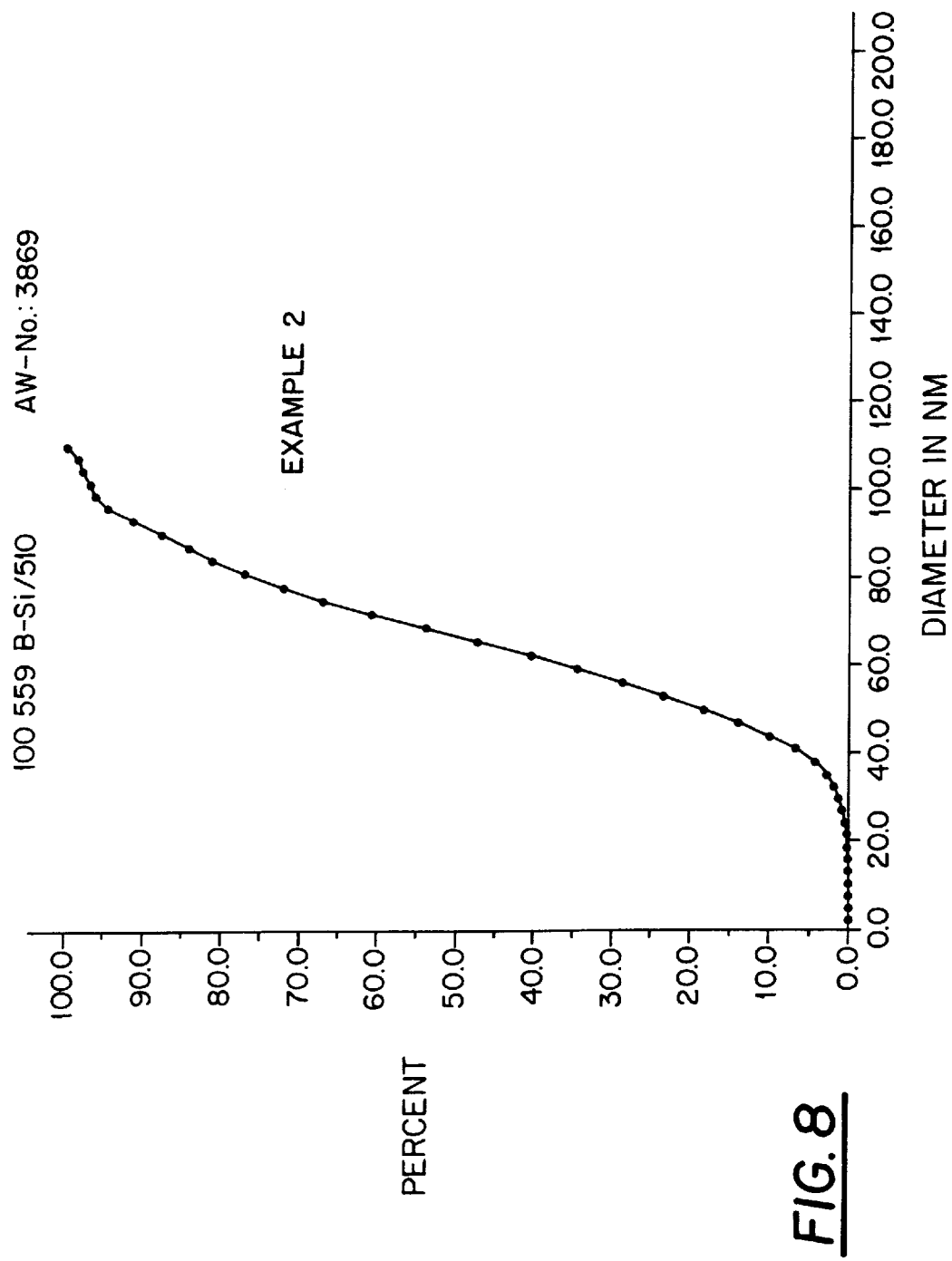
FIG. 8 is a summation curve of the weight distribution of Example 2.
Figure 9:
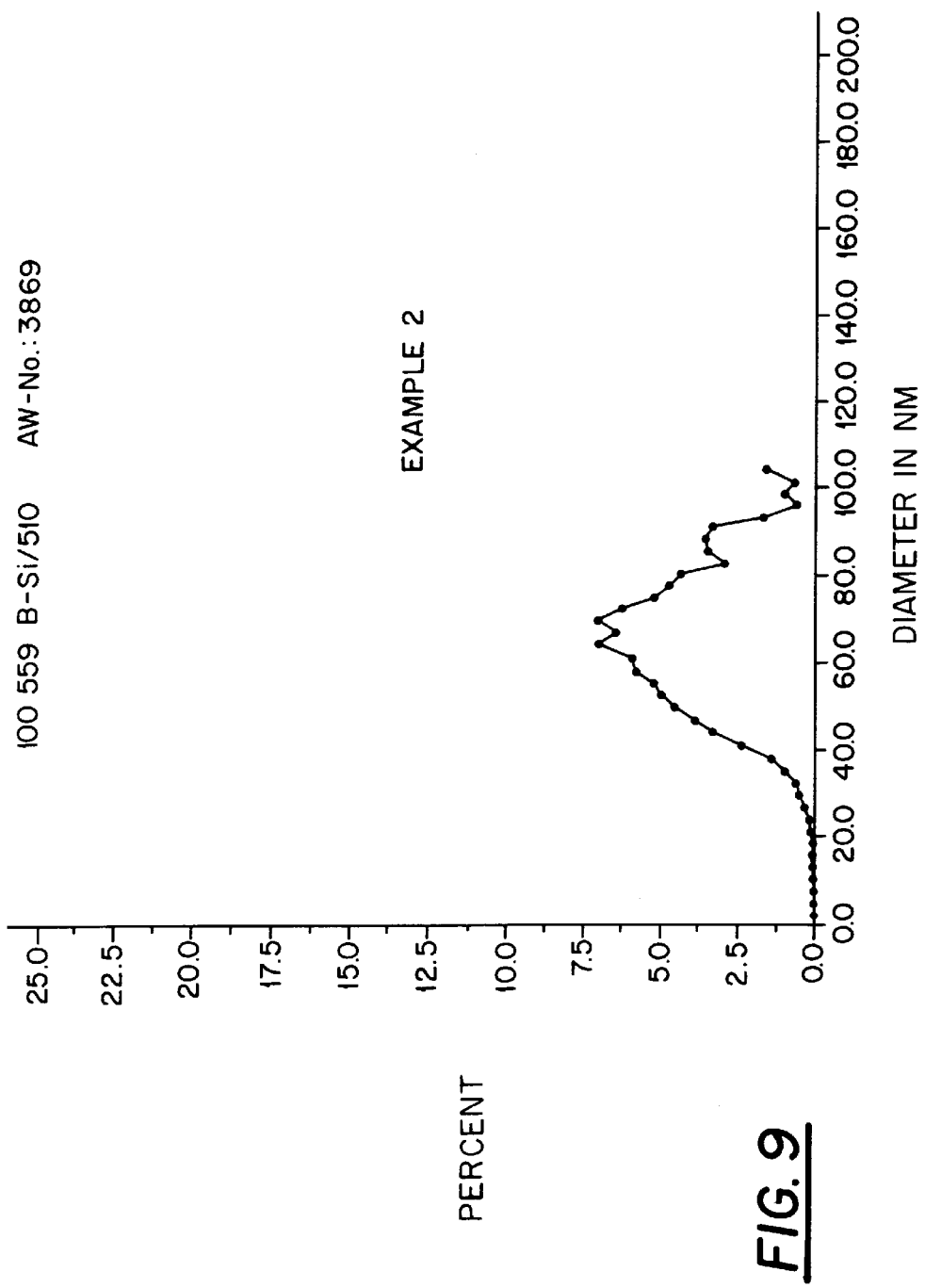
FIG. 9 is a differential curve of the weight distribution of Example 2.
Figure 10:
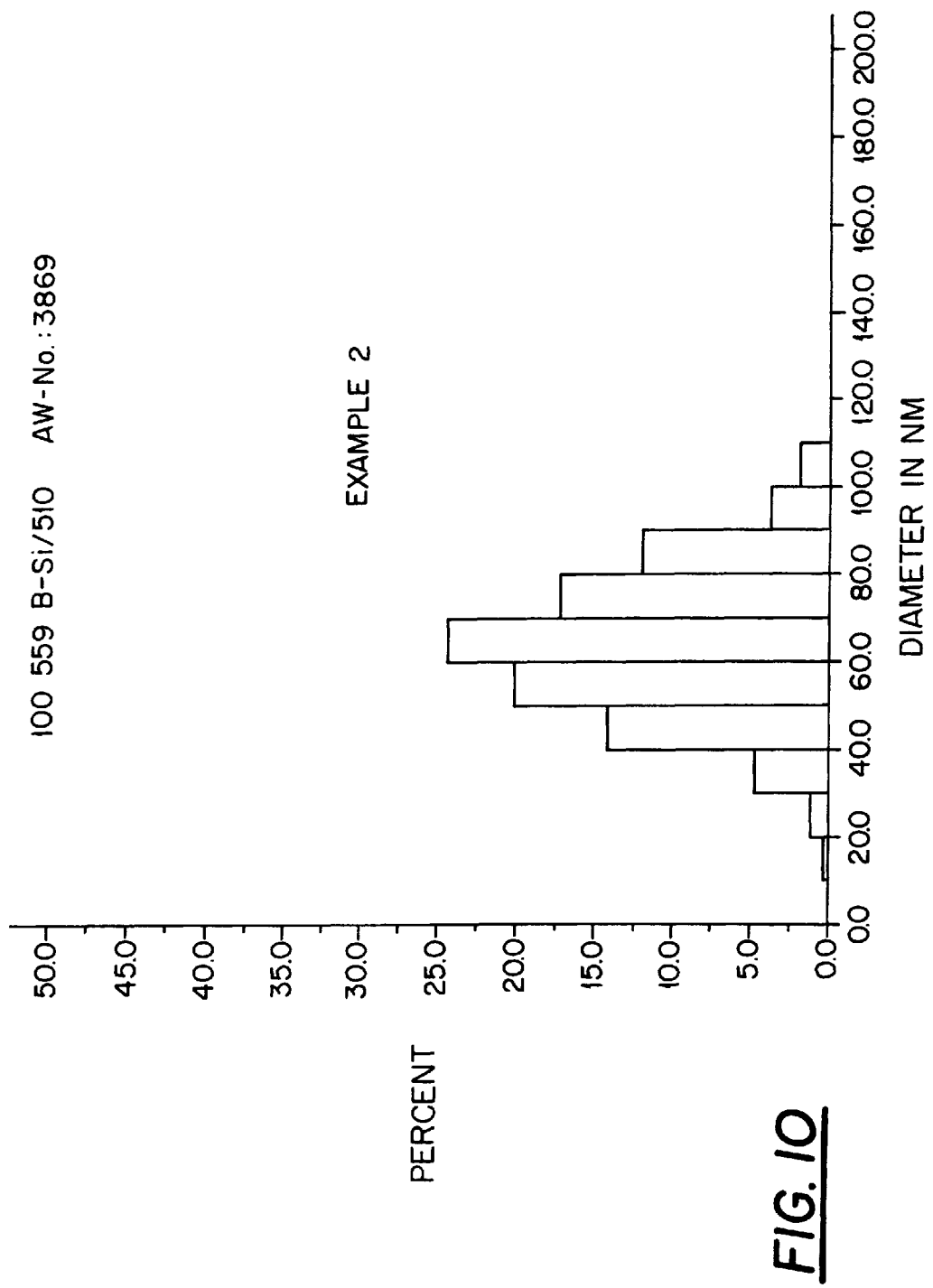
FIG. 10 is a class frequency representation of the weight distribution of Example 2.
Figure 11:
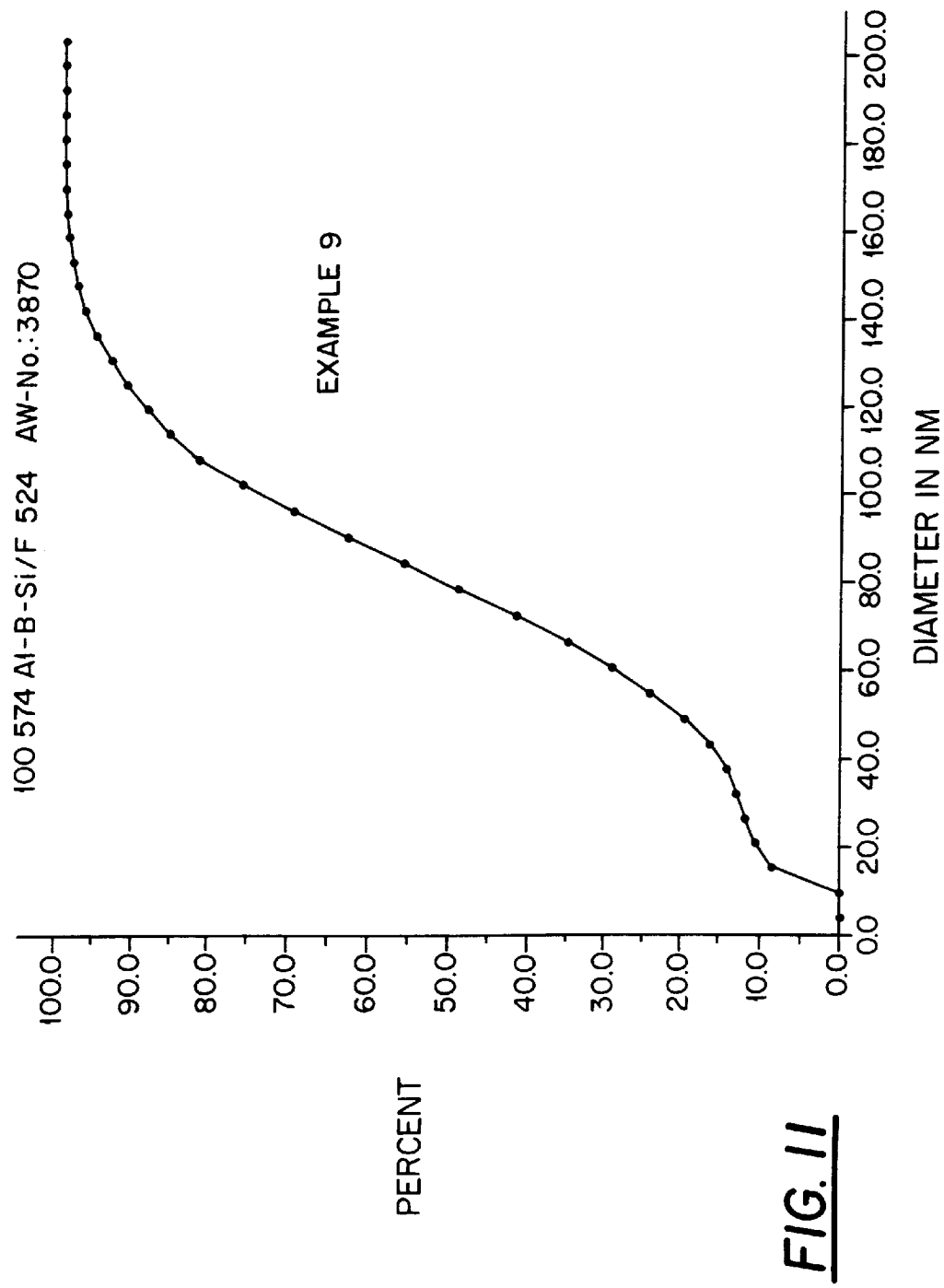
FIG. 11 is a summation curve of the number distribution of Example 9.
Figure 12:
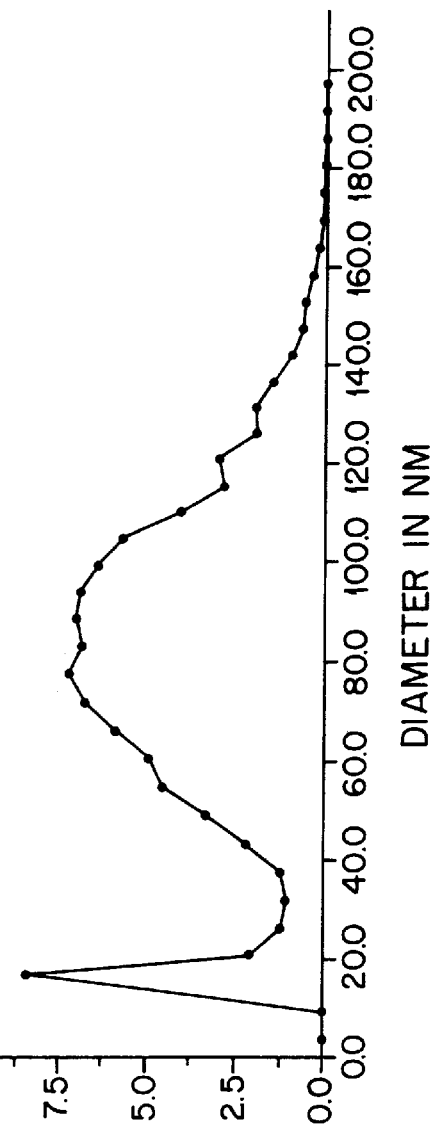
FIG. 12 is a differential curve of the number distribution of Example 9
Figure 13:
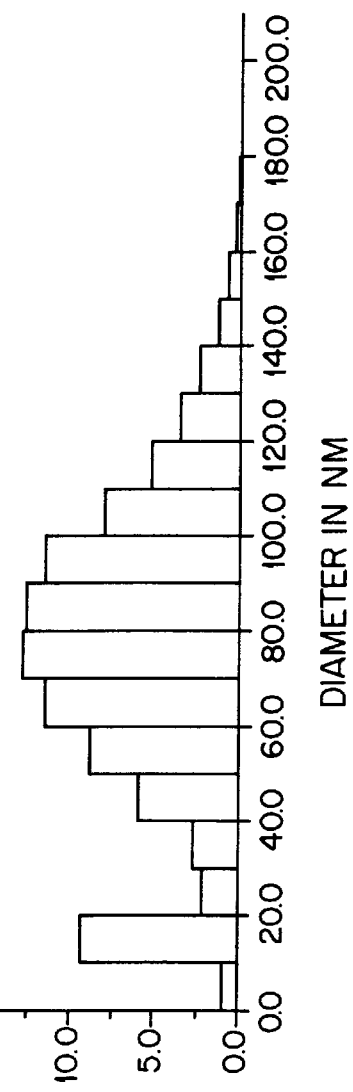
FIG. 13 is a class frequency representation of the number distribution of Example 9.
Figure 14:
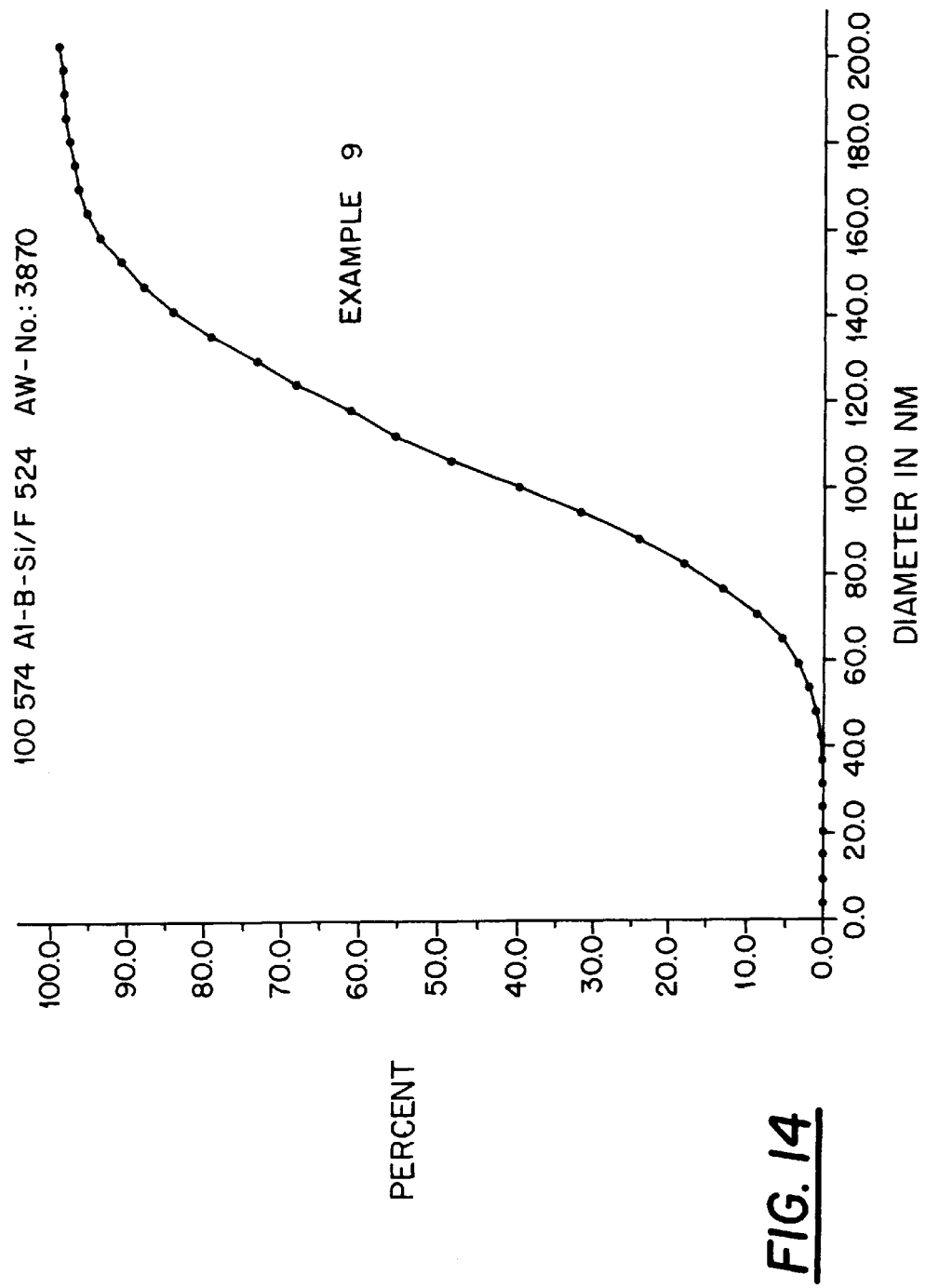
FIG. 14 is a summation curve of the weight distribution of Example 9.
Figure 15:
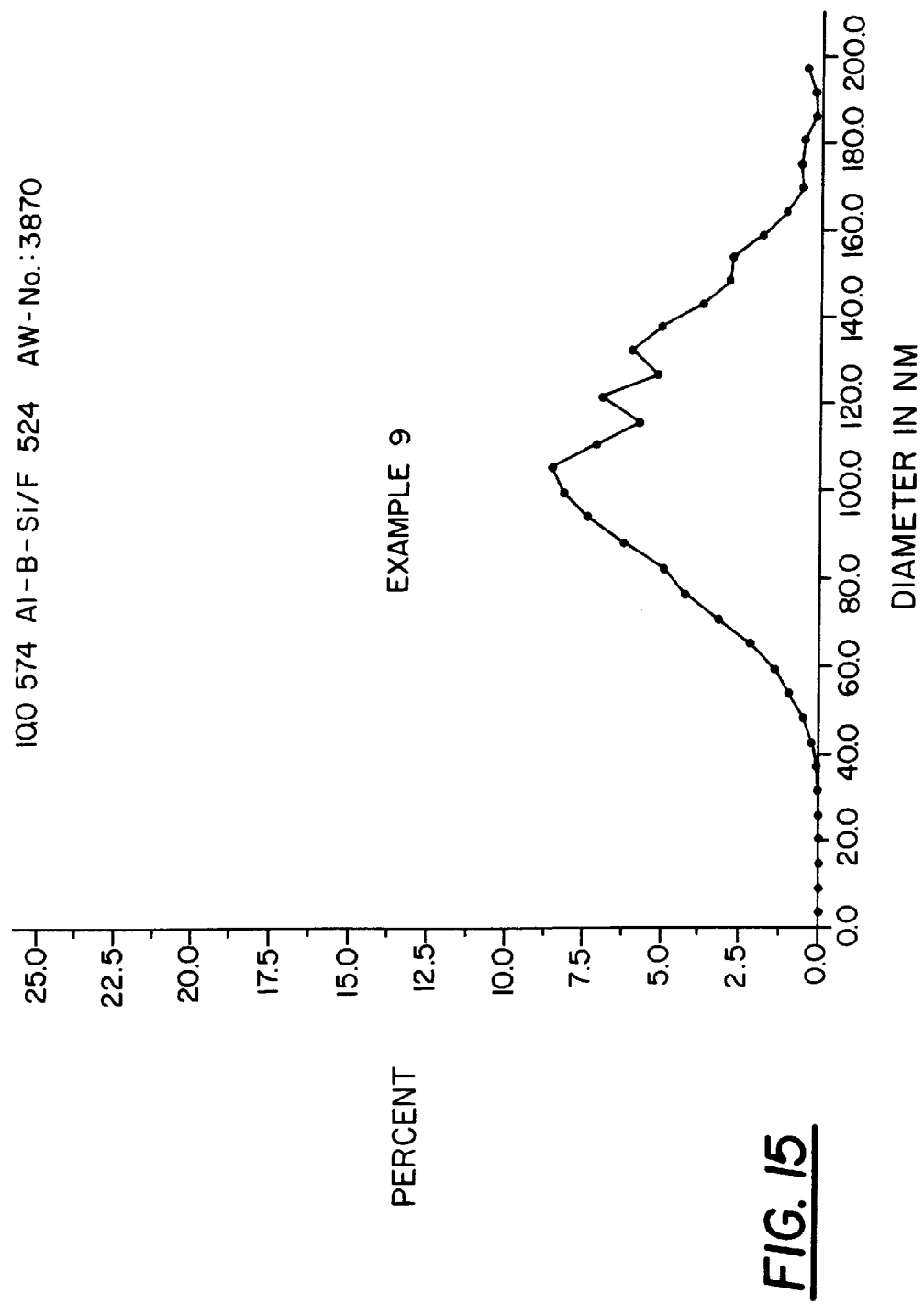
FIG. 15 is a differential curve of the weight distribution of Example 9.
Figure 16:
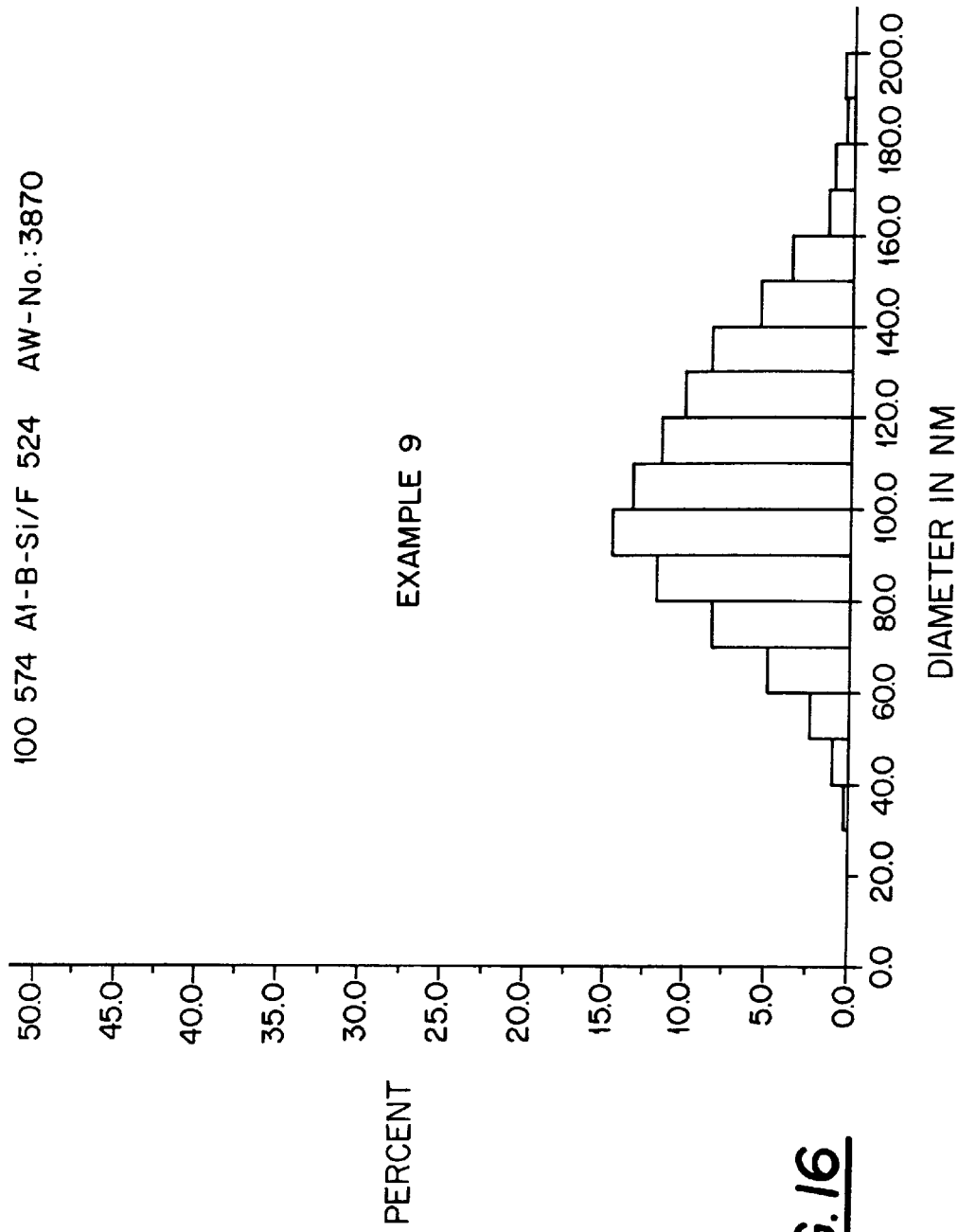
FIG. 16 is a class frequency representation of the weight distribution of Example 9.

Examples of the Preparation of Boron Oxide-aluminum oxide-silicon Dioxide Mixed Oxide The burner arrangement for Examples 5 to 9 is illustrated diagrammatically in FIG. 2.

Example 5

The two liquids $SiCl_4$ and trimethyl borate are mixed in the desired ratio before being vaporised and are then converted together into the gaseous phase in a vaporiser at 135° C. 0.876 kg/h of $SiCl_4$ is vaporised together with 0.231 kg/h of trimethyl borate. The gases are conveyed with a stream of nitrogen at a rate of 0.120 $Nm^3/h$ into the mixing chamber of the burner mentioned in Example 1.

The temperature of the furnace in which the burner is housed is ca. 240° C. 0.056 kg/h of $AlCl_3$ is vaporized in a separate vaporiser at temperatures of ca. 230° C. and is similarly conveyed in a stream of nitrogen as carrier gas at a rate of 0.120 $Nm^3/h$ into the mixing chamber of this burner.

0.938 Nm3/h of air as well as 0.196 $Nm^3/h$ of oxygen and 0.254 $Nm^3/h$ of hydrogen are introduced into the burner mixing chamber.

The gas mixture flows at a rate of 17 m/sec (referred to standard conditions) from the nozzle opening of the burner and burns in a reaction chamber (flame pipe).

The temperature of the gas mixture ($SiC_4$, $AlCl_3$, air, hydrogen, oxygen, and trimethyl borate) is measured at the mouth of the burner and found to be 235° C. 0.05 $Nm^3/h$ of hydrogen (jacket hydrogen, room temperature) is fed intos the annular nozzle surrounding the mouth of the burner.

After flame hydrolysis the reaction gases and the boron oxide-silicon dioxide-aluminium oxide mixed oxide are sucked through a cooling system by applying a vacuum and cooled to ca. 100° to 160° C. The solid is separated from the waste gas stream in a filter. The solid (boron oxide aluminium oxide-silicon dioxide mixed oxide) is in the form of a white, finely divided powder.

The specific surface of the boron oxide-aluminum oxide silicon dioxide mixed oxide is 28 $m^2/g$, the analytically determined $B_2O_3$ content is 12.3 wt. % (=3.8 wt. % of boron) and the analytically determined $Al_2O_3$ content is 3.9 wt. %.

Example 6

The procedure described in Example 5 is adopted, the following amounts being used: 0.83 kg/h of $SiCl_4$ is vaporised together with 0.219 kg/h of trimethyl borate and conveyed in a stream of nitrogen at a rate of 0.120 $Nm^3/h$ into the mixing chamber of the burner mentioned in Example 1. 0.108 kg/h of $AlCl_3$ is vaporised in a separate vaporiser at a temperature of ca. 240° C. and conveyed in a stream of nitrogen as carrier gas at a rate of 0.120 $Nm^3/h$ into the mixing chamber of this burner.

0.782 $Nm^3/h$ of air as well as 0.164 $Nm^3/h$ of oxygen and 0.255 $Nm^3/h$ of hydrogen are introduced into the same mixing chamber.

The gas outflow temperature at the mouth or the burner is 235° C.

After flame hydrolysis and oxidation, and separation of the gaseous reaction gases, a boron oxide-aluminium oxide silicon dioxide mixed oxide is obtained having a BET surface of 30 $m^2/g$, the analytically determined $B_2O_3$ content being 13.9 wt. % (=4.3 wt. % of boron) and the analytically determined $Al_2O_3$ content being 8.3 wt. %.

Example 7

The procedure described in Example 5 is adopted, the following amounts being used:

0.788 kg/h of SiCl4 is vaporised together with 0. 208 kg/h of trimethyl borate and conveyed in a stream of nitrogen at a i rate of 0.120 $Nm^3/h$ into the mixing chamber of the burner mentioned in Example 1. 0.151 kg/h of $AlCl_3$ is vaporised in a separate vaporiser at temperatures of ca. 240° C. and conveyed in a stream of carrier gas at a rate of 0.120 $Nm^3/h$ into the mixing chamber of this burner. 0.762 Nm3/h of air as well as 0.160 Nm³/h of oxygen and 0.257 Nm³/h of hydrogen are introduced into the same mixing chamber.

The gas outlet temperature at the mouth of the burner is 235° C.

After flame hydrolysis and separation of the gaseous reaction gases, a boron oxide-aluminium oxide-silicon dioxide mixed oxide is obtained having a BET surface of 37 m²/g, the analytically determined $B_2O_3$ content being 14.3 wt. % (4.4 wt. % of boron) and the analytically determined $Al_2O_3$ content being 12.9 wt. %.

Example 8

The procedure described in Example 5 is adopted, the following amounts being used:

0.721 kg/h of SiCl4 is vaporised together with 0.190 kg/h of trimethyl borate and conveyed in a stream of nitrogen at a rate of 0.120 Nm³/h into the mixing chamber of the burner mentioned in Example 1. 0.232 kg/h of $AlCl_3$ is vaporised in a separate vaporiser at a temperature of ca. 240° C. and conveyed in a stream of carrier gas at a rate of 0.120 Nm³/h into the mixing chamber of this burner.

0.842 Nm³/h of air as well as 0.176 Nm³/h of oxygen and 0.259 Nm³/h of hydrogen are introduced into the same mixing chamber.

The gas outlet temperature at the mouth of the burner is 235° C.

After flame hydrolysis and separation of the gaseous reaction gases, a boron oxide-aluminium oxide-silicon 29 m²/g, the analytically determined $B_2O_3$ content being 14.6 wt. % (=4.5 wt. % of boron) and the analytically determined $Al_2O_3$ content being 19.3 wt. %.

Example 9

The procedure described in Example 5 is adopted, the following amounts being used:

0.641 kg/h of $SiCl_4$ is vaporised together with 0.169 kg/h of trimethyl borate and conveyed in a stream of nitrogen at a rate of 0.120 Nm³/h into the mixing chamber of the burner mentioned in Example 5. 0.321 kg/h of $AlCl^3$ is vaporised in a separate vaporiser at a temperature of ca. 240° C. and conveyed in a stream of carrier gas at a rate of 0.120 Nm³/h into the mixing chamber of this burner.

0.800 Nm³/h of air as well as 0.167 Nm³/h of oxygen and 0.261 Nm³/h of hydrogen are introduced into the same mixing chamber.

The gas outlet temperature at the mouth of the burner is 235° C.

After flame hydrolysis and separation of the gaseous reaction gases a boron oxide-aluminium oxide-silicon dioxide mixed oxide is obtained having a BET surface of 37 m²/g, the analytically determined $B_2O_3$ content being 12.9 wt. % (=4.0 wt. % of boron) and the analytically determined $Al_2O_3$ content being 29.0 wt. %.

The boron oxide-aluminium oxide-silicon dioxide mixed oxide obtained has the following particle size distribution:

Total number of particles (N) 4349

Particle diameter, arithmetic mean (DN) 77.66 (NM)

Particle diameter, averaged over surface (DA) 101.81 (NM)

Percentage distribution

| Diameter D (NM) | Number N | Number % | Sum Number % | Sum Wt. % |
|---|---|---|---|---|
| 14.900 | 367. | 8.439 | 8.439 | 0.038 |
| 20.420 | 90. | 2.069 | 10.508 | 0.062 |
| 25.940 | 53. | 1.219 | 11.727 | 0.092 |
| 31.460 | 47. | 1.081 | 12.808 | 0.138 |
| 36.980 | 54. | 1.242 | 14.049 | 0.224 |
| 42.500 | 95. | 2.184 | 16.234 | 0.454 |
| 48.020 | 143. | 3.288 | 19.522 | 0.953 |
| 53.540 | 198. | 4.553 | 24.074 | 1.912 |
| 59.060 | 214. | 4.921 | 28.995 | 3.302 |
| 64.580 | 255. | 5.863 | 34.859 | 5.468 |
| 70.100 | 293. | 6.737 | 41.596 | 8.650 |
| 75.620 | 315. | 7.243 | 48.839 | 12.946 |
| 81.140 | 297. | 6.829 | 55.668 | 17.949 |
| 86.660 | 306. | 7.036 | 62.704 | 24.230 |
| 92.180 | 300. | 6.898 | 69.602 | 31.640 |
| 97.700 | 278. | 6.392 | 75.994 | 39.815 |
| 103.220 | 248. | 5.702 | 81.697 | 48.416 |
| 108.740 | 176. | 4.047 | 85.744 | 55.553 |
| 114.260 | 123. | 2.828 | 88.572 | 61.339 |
| 119.780 | 129. | 2.966 | 91.538 | 68.330 |
| 125.300 | 84. | 1.931 | 93.470 | 73.541 |
| 130.820 | 86. | 1.977 | 95.447 | 79.613 |
| 136.340 | 64. | 1.472 | 96.919 | 84.728 |
| 141.860 | 42. | 0.966 | 97.885 | 88.509 |
| 147.380 | 29. | 0.667 | 98.551 | 91.436 |
| 152.900 | 25. | 0.575 | 99.126 | 94.254 |
| 158.420 | 15. | 0.345 | 99.471 | 96.135 |
| 163.940 | 8. | 0.184 | 99.655 | 97.247 |
| 169.460 | 4. | 0.092 | 99.747 | 97.861 |
| 174.980 | 4. | 0.092 | 99.839 | 98.536 |
| 180.500 | 3. | 0.069 | 99.908 | 99.093 |
| 186.020 | 1. | 0.023 | 99.931 | 99.296 |
| 191.540 | 1. | 0.023 | 99.954 | 99.517 |
| 197.060 | 2. | 0.046 | 100.000 | 100.000 |

DN=77/66

DA=101.81

D50=76.56

K=6

A(K)=0.0991

FQS=1.7952

DN/D50=1. U144

DA/D50=1.3298

DA/DN=1.3110

These data are shown graphically in FIGS. 11 to 16.

TABLE 4

Experimental conditions and flame parameters calculated therefrom in the preparation of pyrogenic boron-silicon-aluminium mixed oxides

| No | SiCl₄ [kg/h] | TMB [kg/h] | AlC₃ [kg/h] | Air [Nm³/h] | O₂ [Nm³/h] | H₂ [Nm³/h] | gamma [—] | lambda [—] | BET [m²/g] |
|---|---|---|---|---|---|---|---|---|---|
| 5 | 0.876 | 0.231 | 0.056 | 0.938 | 0.196 | 0.254 | 1.95 | 1.10 | 28 |
| 6 | 0.830 | 0.219 | 0.108 | 0.782 | 0.164 | 0.255 | 1.90 | 0.97 | 30 |
| 7 | 0.788 | 0.208 | 0.151 | 0.762 | 0.160 | 0.257 | 1.87 | 0.97 | 27 |

TABLE 4-continued

Experimental conditions and flame parameters calculated therefrom in the preparation of pyrogenic boron-silicon-aluminium mixed oxides

| No | SiCl$_4$ [kg/h] | TMB [kg/h] | AlC$_3$ [kg/h] | Air [Nm$^3$/h] | O$_2$ [Nm$^3$/h] | H$_2$ [Nm$^3$/h] | gamma [—] | lambda [—] | BET [m$^2$/g] |
|---|---|---|---|---|---|---|---|---|---|
| 8 | 0.721 | 0.190 | 0.232 | 0.842 | 0.176 | 0.259 | 1.78 | 1.10 | 29 |
| 9 | 0.641 | 0.169 | 0.321 | 0.800 | 0.167 | 0.261 | 1.70 | 1.11 | 29 |

TMB=Trimethyl borate B(OCH$_3$)$_3$
Ratio H$_2$ gamma=Ratio of fed-in hydrogen in the core (taking into account the hydrogen contained in TMB) to stoichiometrically required hydrogen Ratio O$_2$ lambda=Ratio of fed-in oxygen (atmospheric oxygen+additionally added O2) in the burner to stoichiometrically required oxygen

TABLE 5

Analytical data of the samples (Al—B—Si mixed oxide) obtained according to Examples 5 to 9

| | Before deacidification | | | | | After deacidification | | | | |
|---|---|---|---|---|---|---|---|---|---|---|
| No. | BET m$^2$/g | B$_2$O$_3$ Wt. % | Al$_2$O$_3$ Wt. % | TV Wt. % | GV Wt. % | BET m$^2$/g | B$_2$O$_3$ Wt. % | Al$_2$O$_3$ Wt. % | TV Wt. % | GV Wt. % |
| 5 | 28 | 12.3 | 3.9 | 0.5 | 3.2 | 27 | 13.5 | 4.5 | 0.2 | 2.1 |
| 6 | 30 | 13.9 | 8.3 | 1.6 | 3.3 | 29 | 13.9 | 9.3 | 0.2 | 2.2 |
| 7 | 27 | 14.3 | 12.9 | 0.7 | 3.5 | 29 | 13.0 | 12.9 | 0.6 | 1.7 |
| 8 | 29 | 14.6 | 19.3 | 1.9 | 3.7 | 32 | 13.2 | 19.4 | 1.1 | 1.5 |
| 9 | 27 | 12.9 | 29.0 | 0.6 | 1.9 | 34 | 12.4 | 27.0 | 0.3 | 1.5 |

TV=Drying loss (2 h at 105° C., according to DIN/ISO 787/II, ASTM D 280, JIS K 5101/21)
GV=Annealing loss (2 h at 1000° C., according to DIN 5bY21, ASTM D 1208, JIS K 5101/23, referred to the substance dried for 2 hours at 105° C.

TABLE 6

Further analytical data of the samples (Al—B—Si-mixed oxide) obtained according to Examples 5 to 9

| | Before deacidification | | | | | After deacidification | | | | |
|---|---|---|---|---|---|---|---|---|---|---|
| No | BET m$^2$/g | Cl content ppm | pH | Bulk density g/l | Tamped density g/l | BET m$^2$g | Cl content ppm | pH | Bulk density g/l | Tamped density g/l |
| 5 | 28 | 150 | 3.47 | 65 | 82 | 27 | 130 | 3.90 | 175 | 236 |
| 6 | 30 | 148 | 3.79 | 76 | 91 | 29 | 85 | 4.06 | 190 | 240 |
| 7 | 27 | 132 | 3.84 | 80 | 97 | 29 | 115 | 4.38 | 210 | 270 |
| 8 | 29 | 223 | 4.21 | 74 | 97 | 32 | 310 | 4.45 | 202 | 255 |
| 9 | 27 | 210 | 4.33 | 75 | 90 | 34 | 414 | 4.55 | 215 | 276 | pH=pH in 4 percent aqueous suspension.
Tamped density according to DIN/ISO 787/XI, JIS K 5101/18 (not screened).

What is claimed is:

1. A process for preparing a boron oxide-silicon dioxide mixed oxide, comprising the steps of:

vaporizing at least one member selected from the group consisting of a silicon halide and organosilicon halide in a carrier gas;

vaporizing a boron compound in a carrier gas;

mixing the halide and boron vapors with hydrogen and air;

reacting the mixed vapors and gases in a flame; and cooling the reaction product and separating gas from solid material.

2. A process according to claim 1, wherein;

mixing of the halide and boron vapors with hydrogen and air additionally occurs in the presence of at least one member selected from the grout consisting of oxygen and nitrogen.

3. A process according to claim 1, further comprising:

heat treating the solid material to remove residue adhering thereto.

4. A process according to claim 2, further comprising:

heat treating the solid material to remove residue adhering thereto.

5. A process according to claim 1, further comprising:

additionally vaporizing at least one member selected from the group consisting of a metal and a metalloid in a carrier gas.

6. A process according to claim 5, wherein;

mixing of the vapors with hydrogen and air additionally occurs in the presence of at least one member selected from the croup consisting of oxygen and nitrogen.

7. A process according to claim 5, further comprising:

heat treating the solid material to remove residue adhering thereto.

8. A process according to claim 6, further comprising:

heat treating the solid material to remove residue adhering thereto.

9. A process according to claim 1, further comprising:

additionally mixing at least one member selected from the group consisting of a metal and a metalloid, with the halide and boron vapors, hydrogen and air.

10. A process according to claim 9, wherein:

mixing of the vapors with hydrogen and air additionally occurs in the presence of at least one member selected from the group consisting of oxygen and nitrogen.

11. A process according to claim 9, further comprising:

heat treating the solid material to remove residue adhering thereto.

12. A process according to claim 10, further comprising:

heat treating the solid material to remove residue adhering thereto.

* * * * *